Feb. 6, 1968  V. SUNG  3,367,709
VEHICLE PASSENGER COMPARTMENT SUSPENSION SYSTEM
Filed May 11, 1966  2 Sheets-Sheet 1

Victor Sung
INVENTOR.

BY *Clarence A. O'Brien*
*and Harvey B. Jacobson*
Attorneys

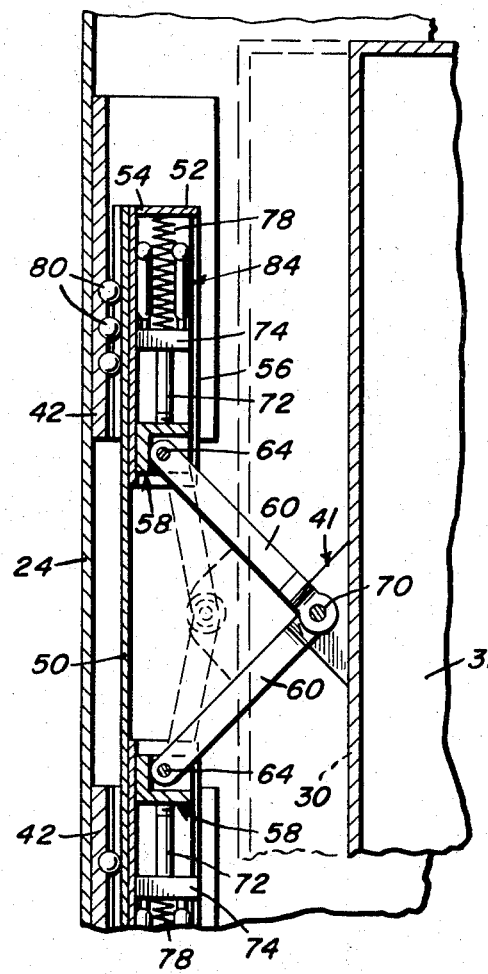
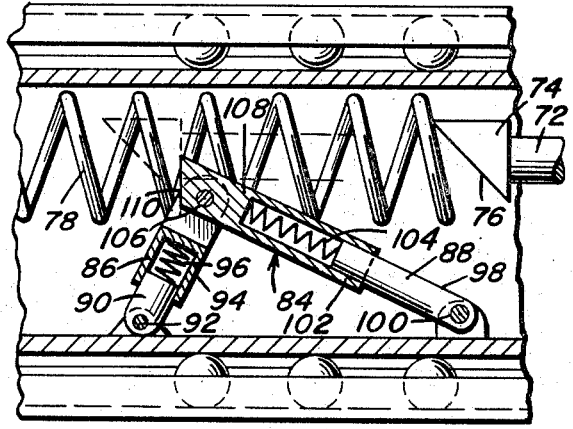
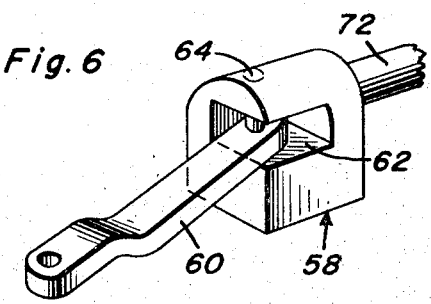
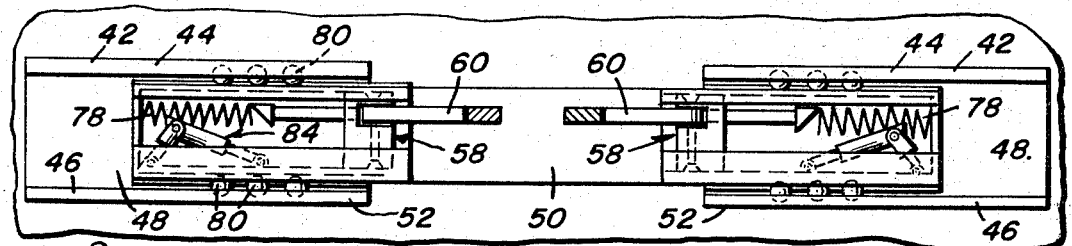
Victor Sung
INVENTOR.

United States Patent Office 3,367,709
Patented Feb. 6, 1968

3,367,709
VEHICLE PASSENGER COMPARTMENT
SUSPENSION SYSTEM
Victor Sung, Syracuse, N.Y.
(198—51 Foothill Ave., Hollis, Queens, N.Y. 11423)
Filed May 11, 1966, Ser. No. 549,382
11 Claims. (Cl. 296—35)

This invention relates to a novel and useful vehicle passenger compartment suspension system and more specifically to a vehicle combination including an elongated main frame provided with sprung running gear and having a passenger compartment supported from the frame for oscillation both transversely and longitudinally of the frame between limit positions of transverse and longitudinal oscillation.

By such construction, the passenger compartment may be biased toward center positions of transverse and longitudinal oscillation in a manner such that the biasing means utilized may perform the function of absorbing shock, as far as the passenger compartment is concerned, should the vehicle be struck from either end or side and the passengers within the passenger compartment will, therefore, be cushioned against the full shock of such impact on the frame.

The suspension system of the instant invention, in addition to providing means for supporting a passenger compartment relative to a frame for limited oscillation both transversely and longitudinally of the frame, further includes means supporting the passenger compartment against vertical displacement in at least one direction relative to the frame. Of course, if it is desired, such means may also be operative to prevent vertical displacement of the passenger compartment in both directions relative to the frame.

The main object of this invention is to provide a vehicle passenger compartment suspension system supporting a passenger compartment from an associated vehicle frame portion in a manner such that the passenger compartment will be cushioned from impact of the frame with an object from either end or side of the vehicle by relative movement between the passenger compartment and the frame.

Another object of this invention, in accordance with the immediately preceding object, is to provide means for biasing the vehicle passenger compartment toward center positions of transverse and longitudinal oscillation relative to the associated frame.

A still further object of this invention is to provide biasing means including means for snubbing "rebound" movement of the passenger compartment relative to the associated frame after longitudinal or transverse impact with the frame is experienced.

A final object of this invention to be specifically enumerated herein is to provide a vehicle passenger compartment suspension system in accordance with the preceding objects which will conform with conventional forms of manufacture, be of simple construction, and automatic in operation so as to provide a device that will be economically feasible, long lasting and operative at all times.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a schematic horizontal sectional view taken through a vehicle constructed in accordance with the present invention and illustrating the manner in which the passenger compartment of the vehicle is guidingly supported from the frame thereof for oscillation both transversely and longitudinally of the frame between limit positions of transverse and longitudinal oscillation and with portions of the vehicle frame and running gear illustrated in phantom lines;

FIGURE 3 is a fragmentary horizontal sectional view taken substantially upon a plane indicated by section line 3—3 of FIGURE 2;

FIGURE 4 is an enlarged fragmentary transverse vertical sectional view taken substantially upon a plane indicated by section line 4—4 of FIGURE 1;

FIGURE 5 is an enlarged fragmentary transverse vertical sectional view taken substantially upon a plane indicated by the section line 5—5 of FIGURE 1;

FIGURE 6 is a fragmentary perspective view of a portion of one of the slide members of the suspension system and its connecting rod; and FIGURE 7 is a fragmentary transverse vertical sectional view similar to that of FIGURE 5 but with movable portions of the suspension system illustrated in different positions of operation.

Figure 1:
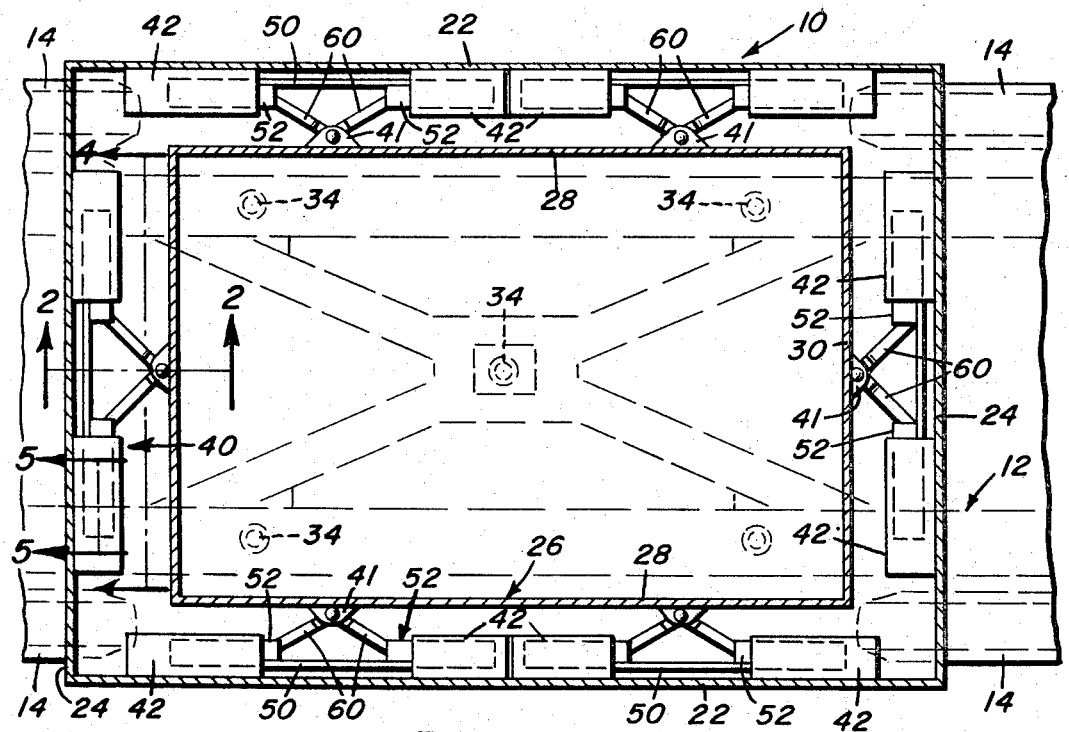
Figure 2:
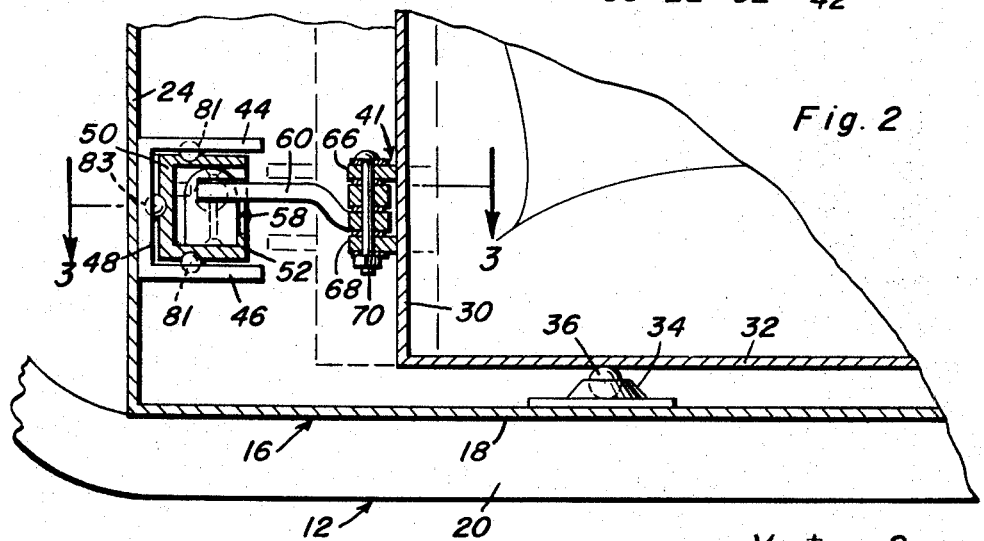
FIGURE 2 is an enlarged longitudinal vertical sectional view taken substantially upon the plane indicated by the section line 2—2 of FIGURE 1.

Referring now more specifically to the drawings the numeral 10 generally designates a vehicle including a main frame referred to in general by the reference numeral 12 and provided with sprung running gear in the form of ground engaging support wheels 14.

The frame 12 includes a subframe generally referred to by the reference numeral 16 and including a bottom wall portion 18 supported from the longitudinal rail members 20 of the main frame 12 is fixed position thereon and upstanding opposite side and end wall portions 22 and 24.

The vehicle 10 further includes a passenger compartment which is generally referred to by the reference numeral 26 and includes opposite side wall portions 28 and opposite end wall portions 30 interconnected by means of a bottom wall portion 32. The suspension system of the instant invention includes the subframe 16, the passenger compartment 26 and the operative connections therebetween which mount the passenger compartment 26 from the subframe 16 for limited transverse and longitudinal reciprocation relative thereto.

The bottom wall portion 18 is supported from the longitudinal members 20 of the main frame 12 in any convenient manner rigidly securing subframe 16 to the main frame 12 although resilient spacing members between the bottom wall portion 18 and the main frame 12 may be utilized if it is desired to partially isolate the subframe 16 from the road shocks experienced by the frame 12. The bottom wall portion 18 has a plurality of bearing supports 34 secured thereto and each of the bearing supports includes a spherical ball bearing element 36 which projects upwardly from the corresponding support 34. The bottom wall portion 32 of the passenger compartment 26 rests upon the upper surface portions of the ball bearing elements 36 and is therefore supported from the bottom wall portion 18 for movement in all directions in a horizontal plane by means of anti-friction bearing means.

However, between each pair of corresponding side and end walls of the subframe 16 and the passenger compartment 26, at least one impact absorbing assembly generally referred to by the reference numeral 40 is provided for limiting movement of the corresponding wall of the passenger compartment 26 toward the corresponding wall of the subframe 16.

Each assembly 40 includes a bifurcated mount generally referred to by the reference numeral 41 carried by the corresponding wall of the passenger compartment 26 and a pair of slide guides 42 secured to the corresponding wall of the subframe 16. The slide guides 42 are generally channel shaped in cross-section and are longitudinally spaced apart along the corresponding side wall of the subframes 16 and secured thereto in longitudinal alignment. The slide guides 42 open toward the corresponding side wall of the passenger compartment 26 and include a pair of upper and lower flanges 44 and 46 interconnected at their outer edge portions by means of a bight portion 48 secured to the corresponding side wall of the subframe 16. In addition, each of the assemblies 40 includes a slide follower 50 including generally tubular opposite end portions 52 opening toward each other, including end walls 54 on their remote ends, and longitudinally slotted along their inner side portions as at 56. Further, the assemblies 40 each includes a pair of piston assemblies generally referred to by the reference numerals 58 and slidably disposed in the corresponding opposite end portions 52 with their adjacent ends anchored to the corresponding bifurcated mount 41 by means of connecting rod members 60.

The adjacent ends of each pair of piston assemblies 58 are notched as at 62 and the ends of the connecting rod members 60 remote from the bifurcated mount 41 are pivotally secured within the corresponding notches 62 by means of pivot pins 64. The ends of the connecting rod members 60 remote from the corresponding piston assemblies 58 are pivotally secured between the furcations 66 and 68 of the bifurcated mount 41 by means of a pivot pin 70.

The ends of the piston assemblies 58 remote from the notches 62 include rod portions 72 projecting away from each other and including crossheads 74 which are generally triangular in transverse cross-sectional shape and define inclined cam surfaces 76. A compression spring 78 is disposed between each end wall 54 and the corresponding crosshead 74 and thereby yieldingly urges the associated piston assembly 58 toward the piston assembly 58 disposed in the other end portion 52 of the slide follower 50. Further, it may be seen from FIGURES 2, 3, 4 and 5 of the drawings that the slide follower 50 has its opposite end portions 52 guidably supported in the corresponding slide guides 42 by means of spherical ball bearing elements 80 held captive in a groove 81 in each flange 44 and 46 as well as in a groove 83 in each bight portion 48 and rollingly disposed in corresponding grooves formed in the confronting surfaces of the associated end portion 52.

With attention now invited to FIGURES 3–7 of the drawings, it may be seen that each of the end portions 52 has a pair of rebound dampening or snubbing assemblies 84 disposed therein for coaction with the corresponding crosshead 74. Each of the rebound dampening assemblies 84 includes first and second longitudinally extendable members 86 and 88. The member 86 includes a first end portion 90 which is pivotally secured to the end portion 94 telescoped over the free end of the end portion 90. A compression spring 96 is operatively connected between the end portions 90 and 94 and yieldingly urges the extendable member 86 toward its fully extended position.

The second extendable member 88 includes an end portion 98 which is pivotally supported from the corresponding end portion 52 as at 100 and the second end portion 102 of the extendable member 88 is telescoped over the free end of the end portion 98 with a compression spring 104 disposed between the end portions 98 and 102 yieldingly urging the extendable member 88 toward its fully extended position. The end of the end member 102 remote from the end member 88 is pivotally supported from the bifurcated end of the associated end portion 94 remote from the end portion 90 as at 106 and defines an inclined cam surface 108 and an abutment surface 110.

One impact absorbing assembly 40 is disposed between each pair of end walls 24 and 30 and a pair of impact absorbing assemblies 40 is disposed between and spaced longitudinally of each pair of side walls or side wall portions 22 and 28. Accordingly, it may be seen that movement of either end wall 30 toward the corresponding end wall 24 will cause the piston assemblies 58 of the adjacent impact absorbing assembly 40 to move apart and to compress the springs 78. Further, sufficient movement of the piston assemblies 58 apart will cause the cam surface 76 to engage the cam surface 78 thereby collapsing the extendable member 86 until such time as the crosshead 74 passes over the upper end of the cam surface 108 such as illustrated in FIGURE 7 of the drawings. Then, as the end wall 30 stops its movement toward the corresponding end wall 34 and begins to move away from the end wall 34 the abutment surfaces 110 are engaged by the rear faces 114 of the corresponding crossheads 74 and the return of the associated piston assemblies to their rest positions is thereby at least partially checked. Further movement of the piston assemblies 58 to the rest positions will of course cause the extendable members 88 to be collapsed until such time as the uppermost extremity of the abutment surface 110 passes beneath the lower end of the rear faces 114. Thereafter, the piston assemblies 58 are then free to return to their rest positions such as that designated by the position of the crosshead 74 illustrated in solid lines in FIGURE 5 of the drawings.

In operation, should the vehicle 10 experience an impact on either end or side, the passenger compartment 26 will shift in that direction enabling the corresponding impact absorbing assembly or assemblies to absorb some of the shock of the impact by compressing the corresponding springs 78. Of course, rebound of the passenger compartment 26 back toward the rest position illustrated in FIGURE 1 is controlled by the rebound dampening assemblies 84.

If it is desired, the passenger compartment 26 may include any suitable coaction with the subframe 16 preventing the passenger compartment 26 from being elevated relative to the support frame 16.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a vehicle including an elongated frame provided with sprung running gear, a passenger compartment, means guidingly supporting said passenger compartment from said frame for oscillation both transversely and longitudinally of said frame between limit positions of transverse and longitudinal oscillation and against vertical displacement in at least one direction relative to said frame, said means supporting said passenger compartment from said frame against downward vertical displacement relative to said frame and including rolling bearing means disposed between portions of said compartment and said frame supporting the weight of the former relative to the latter.

2. The combination of claim 1 including biasing means connected between said frame and said passenger compartment yieldingly urging said passenger compartment toward generally centered rest positions between the limits of both transverse and longitudinal oscillation of said passenger compartment.

3. In combination with a vehicle including an elongated frame provided with sprung running gear, a passenger compartment, means guidingly supporting said compartment from said frame for oscillation both transversely and longitudinally of said frame between limit positions of transverse and longitudinal oscillation and against vertical displacement in at least one direction relative to said frame, biasing means connected between said frame and said passenger compartment yieldingly urging said passenger compartment toward generally centered rest positions between the limits of both transverse and longitudinal oscillation of said passenger compartment, said biasing means including means operative to yieldingly check rebound movements of said passenger compartment back to said rest positions.

4. The combination of claim 1 including biasing means connected between said frame and said passenger compartment yieldingly urging said passenger compartment toward generally centered rest positions between the limits of both transverse and longitudinal oscillation of said passenger compartment, said biasing means including a single biasing assembly operatively associated with each end portion of said frame and corresponding portions of said compartment and operative to apply a thrust on said compartment toward the other end of said frame along the longitudinal center line of said compartment.

5. The combination of claim 1 including biasing means connected between said frame and said passenger compartment yieldingly urging said passenger compartment toward generally centered rest positions between the limits of both transverse and longitudinal oscillation of said passenger compartment, said biasing means including a pair of biasing assemblies operatively associated with each side of said frame at points spaced longitudinally therealong and corresponding portions of said compartment and operative to apply thrusts on said compartment toward the other side of said frame along lines extending transversely of said frame.

6. The combination of claim 5 wherein said biasing means also includes a single biasing assembly operatively associated with each end portion of said frame and corresponding portions of said compartment toward the other end of said frame along the longitudinal center line of said compartment.

7. The combination of claim 1 including biasing means connected between said frame and said passenger compartment yieldingly urging said passenger compartment toward generally centered rest positions between the limits of both transverse and longitudinal oscillation of said passenger compartment, said biasing means including at least one biasing assembly operatively associated with each end portion and side portion of said frame and the corresponding opposing portion of said compartment and operative to apply a thrust on each of said corresponding portions toward the opposite portion of said compartment.

8. In combination with a vehicle including an elongated frame provided with sprung running gear, a passenger compartment, means guidingly supporting said passenger compartment from said frame for oscillation both transversely and longitudinally of said frame between limit positions of transverse and longitudinal oscillation and against vertical displacement in at least one direction relative to said frame, biasing means connected between said frame and said passenger compartment yieldingly urging said passenger compartment toward generally centered rest positions between the limits of both transverse and longitudinal oscillation of said passenger compartment, said biasing means including at least one biasing assembly operatively associated with each end portion and side portion of said frame and the corresponding opposing portion of said compartment and operative to apply a thrust on each of said corresponding portions toward the opposite portion of said compartment, each of said biasing assemblies including elongated guide means secured to and extending along one opposing portion of each pair of corresponding portions, a pair of slide members guidingly supported from each guide means for individual movement therealong and spaced longitudinally thereof, a pair of connecting rods convergent outwardly of said guide means toward the other opposing portion of said pair of corresponding portions, the ends of said rods adjacent said guide means being pivotally secured to the corresponding slide members for rotation about upstanding axes and the ends of said rods adjacent said other opposing portion being received thereto for rotation about upstanding axes.

9. The combination of claim 8 wherein the last mentioned axes coincide.

10. In combination with a vehicle including an elongated frame provided with sprung running gear, a passenger compartment, means guidingly supporting said passenger compartment from said frame for oscillation both transversely and longitudinally of said frame between limit positions of transverse and longitudinal oscillation and against vertical displacement in at least one direction relative to said frame, biasing means connected between said frame and said passenger compartment yieldingly urging said passenger compartment toward generally centered rest positions between the limits of both transverse and longitudinal oscillation of said passenger compartment, said biasing means including at least one biasing assembly operatively associated with each end portion and side portion of said frame and the corresponding opposing portion of said compartment and operative to apply a thrust on each of said corresponding portions toward the opposite portion of said compartment, each of said biasing assemblies includes elongated guide means secured to and extending along one opposing portion of each pair of corresponding portions, a pair of slide members guidingly supported from each guide means for individual movement therealong and spaced longitudinally thereof, a pair of connecting rods convergent outwardly of said guide means toward the other opposing portion of said pair of corresponding portions, the ends of said rods adjacent said guide means being pivotally secured to the corresponding slide members for rotation about upstanding axes and the ends of said rods adjacent said other opposing portion being received thereto for rotation about upstanding axes, said assemblies each also including means operatively connected between the corresponding slide members and guide means yieldingly urging said slide members toward each other and comprising said biasing means.

11. The combination of claim 10 wherein each of said assemblies further includes means operative to yieldingly check rebound movement of said slide members back toward centered rest positions after having been forced apart.

References Cited

UNITED STATES PATENTS

| 2,743,956 | 5/1956 | Birkenstein | 296—35 |
| 3,321,236 | 5/1967 | Sewelin | 296—35 |

BENJAMIN HERSH, *Primary Examiner.*

L. D. MORRIS, *Assistant Examiner.*